(12) United States Patent
Schanz et al.

(10) Patent No.: US 8,885,337 B2
(45) Date of Patent: Nov. 11, 2014

(54) RETAINING SYSTEM FOR FASTENING AN ELECTRONIC AUXILIARY DEVICE

(76) Inventors: Jochen Schanz, Niedereschach (DE); Herbert Schwarz, Niedereschach (DE)

( * ) Notice: Subject to any disclaimer, the term of this patent is extended or adjusted under 35 U.S.C. 154(b) by 313 days.

(21) Appl. No.: 13/522,990

(22) PCT Filed: Dec. 21, 2010

(86) PCT No.: PCT/DE2010/001496
§ 371 (c)(1), (2), (4) Date: Jul. 19, 2012

(87) PCT Pub. No.: WO2011/088813
PCT Pub. Date: Jul. 28, 2011

(65) Prior Publication Data
US 2012/0293930 A1    Nov. 22, 2012

(30) Foreign Application Priority Data

Jan. 20, 2010    (DE) .......................... 10 2010 005 270

(51) Int. Cl.
| | |
|---|---|
| *G06F 1/16* | (2006.01) |
| *B62J 11/00* | (2006.01) |
| *B60R 11/02* | (2006.01) |
| *B60R 11/00* | (2006.01) |
| *B62J 99/00* | (2009.01) |

(52) U.S. Cl.
CPC ............. *B62J 11/00* (2013.01); *B60R 11/0258* (2013.01); *B60R 2011/0071* (2013.01); *B62J 2099/0033* (2013.01)
USPC ............ 361/679.58; 361/679.56; 361/679.57; 312/223.1; 312/223.2; 248/229.11

(58) Field of Classification Search
USPC ...................................... 248/229.11
See application file for complete search history.

(56) References Cited

U.S. PATENT DOCUMENTS

| | | | | |
|---|---|---|---|---|
| 5,305,381 A | * | 4/1994 | Wang et al. .................... | 379/455 |
| 5,457,745 A | * | 10/1995 | Wang ............................ | 379/454 |
| 5,694,468 A | * | 12/1997 | Hsu ............................... | 379/446 |
| 5,788,202 A | * | 8/1998 | Richter ....................... | 248/316.4 |
| 5,947,359 A | * | 9/1999 | Yoshie ......................... | 224/570 |

(Continued)

FOREIGN PATENT DOCUMENTS

| DE | 19621014 C1 | 5/1997 |
|---|---|---|
| DE | 197 19 512 A1 | 11/1998 |

(Continued)

*Primary Examiner* — Anthony Q Edwards
(74) *Attorney, Agent, or Firm* — Gudrun E. Huckett (57) ABSTRACT

The invention relates to a retaining system for fastening an electronic auxiliary device (13) by means of a retaining element (1), wherein in order to allow flat auxiliary devices (13) also to be reliably attached without the visibility or the operation of the auxiliary device (13) being impaired, the perimeter of the retaining element (1) effective for accommodating the auxiliary device can be adjusted larger in an open position than in a closed position by means of a cam control having a cam disk (5) and controlled by an operating lever (6). The retaining element (1) further comprises a base plate (2), wherein on the base plate (2), the operating lever (6) and the cam disk (5) engaged with the operating lever (6) are pivotably arranged and attachment elements (3) for the auxiliary device (13) that are kept under stress by at least one elastic element (4) are movably arranged, and pivoting the operating lever (6) moves the attachment elements (3) into the open position or into the closed position by means of the cam disk (5).

11 Claims, 6 Drawing Sheets

(56) References Cited

U.S. PATENT DOCUMENTS

| | | | |
|---|---|---|---|
| 6,229,891 B1 * | 5/2001 | Chen | 379/446 |
| 6,229,893 B1 * | 5/2001 | Chen | 379/454 |
| 6,785,567 B2 * | 8/2004 | Kato | 455/575.9 |
| 6,966,533 B1 * | 11/2005 | Kalis et al. | 248/316.4 |
| 7,080,812 B2 * | 7/2006 | Wadsworth et al. | 248/316.6 |
| 7,147,137 B2 | 12/2006 | Schanz et al. | |
| 7,920,905 B2 * | 4/2011 | Bury | 455/575.1 |
| 2005/0156088 A1 * | 7/2005 | Wadsworth et al. | 248/309.1 |

FOREIGN PATENT DOCUMENTS

| | | |
|---|---|---|
| DE | 201 17 127 U1 | 3/2002 |
| DE | 20 2007 009059 U1 | 10/2007 |
| EP | 1 438 225 B1 | 7/2004 |
| FR | 2 917 353 A1 | 12/2008 |

\* cited by examiner

RETAINING SYSTEM FOR FASTENING AN ELECTRONIC AUXILIARY DEVICE

BACKGROUND OF THE INVENTION

The invention concerns a retaining system for fastening an electronic auxiliary device by means of a retaining element.

Such a retaining system is disclosed in EP 1 438 225. The known retaining system is provided for receiving and locking relatively large auxiliary devices. Since auxiliary devices such as navigation devices or smart phones become more and more smaller and more flat, the known retaining system disadvantageously is no longer suitable for auxiliary devices of this kind.

The object of the invention is therefore seen in further developing the retaining system of the aforementioned kind in such a way that even flat auxiliary devices can be retained safely without the visibility of the device or the operation of the device being impaired.

SUMMARY OF THE INVENTION

As a solution to this object it is proposed according to the invention that the retaining system of the aforementioned kind is embodied in accordance with the following features: by means of a cam control with a cam disk controlled by an actuating lever the perimeter of the retaining element that is effective for receiving the auxiliary device is adjustable to be greater in an open position than in a closed position.

As a result of the lever-controlled cam control by means of the cam disk, the perimeter of the retaining element in the open position becomes so large that the auxiliary device can be inserted without problem. In the closed position, the perimeter of the retaining element that is effective for receiving the auxiliary device is then pressed against the auxiliary device such that even flat and small auxiliary devices can be safely retained by means of the retaining system according to the invention without the visibility or the operation of the auxiliary device being impaired.

One embodiment of the invention provides that the retaining element has a baseplate wherein on the baseplate the actuating lever and the cam disk that is engaged by the actuating lever are pivotably supported and fixation elements for the auxiliary device that are tensioned by means of at least one elastic element are slidably arranged and pivoting of the actuating lever moves the fixation elements by means of the cam disk into the open position or into the closed position. The fixation elements are maintained under tension and in the closed position are pressed against the auxiliary device so that the latter is safely secured. It is possible to provide different numbers of fixation elements that press against the edges or corners of the auxiliary device. Usually, four fixation elements for the four corners of the auxiliary device are used.

In order to prevent the auxiliary device from sliding out of the retaining system even in case of a blow or impact, a further embodiment of the invention provides that each fixation element is provided on its inner side with a groove that is open toward the center of the retaining element for insertion of a corner or an edge of the auxiliary device. In this connection, the groove has a shape that is matched to the corner of the auxiliary device so that in case of rounded corners the groove is also embodied to be appropriately curved. In order to arrange the fixation elements slidably on the baseplate, according to a further embodiment of the invention it is provided that each fixation element has a slide shoe which is slidable in a slotted hole guide of the base plate. Other types of guides are also conceivable that are suitable so that in the open position the perimeter of the retaining element is larger than in the closed position by means of the slidable fixation elements.

In order to secure at least one elastic element safely on the fixation elements, a further embodiment of the invention provides that each fixation element has at its outer side at least one groove for insertion of the at least one elastic element. The elastic element is expediently in this context a rubber band or a rubber cord wherein also all other types of elastic elements are suitable that force the fixation elements in the closed position against the auxiliary device.

The cam disk and the correlated cam control of the fixation elements can be arranged in all areas of the retaining element. Advantageously, the cam disk is arranged at the bottom side of the baseplate and has a guide opening that is engaged by a pin that is arranged on the actuating lever. In order to have a force transmission onto the cam disk that is as immediate as possible upon pivoting of the actuating lever, a further embodiment of the invention provides that the cam disk in the area of the guide opening has two lateral stops for the pin wherein the pin is arranged on the actuating lever in such a way that it carries out a part-circular movement upon pivoting of the actuating lever. This arrangement enables in addition that the actuating lever when damaged can be exchanged in a simple way together with the pin because removal and insertion of the pin into the guide opening is very simple.

A further embodiment of the invention provides that on the baseplate a fastening device or a vibration decoupling device and a fastening device are arranged. With the fastening device the retaining element is attached to the motorcycle and by means of the vibration decoupling device the auxiliary device is protected from damage, in particular when traveling across potholes. For the driver it is sometimes of great importance that the image that is displayed on the auxiliary device is shown either in portrait format or in landscape format. A further embodiment of the invention therefore provides that between the baseplate and the fastening device or the vibration decoupling device also a pivot device for pivoting the retaining element by 90 degrees, respectively, is provided in such a way that the auxiliary device can be arranged either in portrait format or in landscape format.

BRIEF DESCRIPTION OF THE DRAWINGS

The invention will be explained in the following with the aid of the drawing in more detail. The drawing shows an embodiment of the invention. In this connection, it is shown in.

DESCRIPTION OF PREFERRED EMBODIMENTS

The retaining system has a retaining element 1 with a baseplate 2, four fixation elements 3, and two elastic elements 4. On the bottom side of the baseplate 2 a cam disk 5 is supported so as to be pivotable and, laterally on the baseplate 2, an actuating lever 6 is also supported so as to be pivotable. The baseplate 2 has in its central area an elongate hexagon shape 7 which is formed monolithically from an elongate rectangular shape and two triangular shapes with isosceles triangles. On each side of the triangular shapes there extends a web 8 diagonally toward the exterior and each web 8 has a slotted hole guide 9 that is arranged at the center of the web 8 and also extends diagonally toward the exterior. Each web 8 is monolithic with the hexagon shape. In the slotted hole guide 9 a slide shoe 10 is inserted which has two monolithically formed parts wherein a first part is arranged above the web 8 and a second part is arranged below the web 8. The first part and the second part are connected to each other by a guide element that is not visible in the drawing and extends in the slotted hole guide 9. The slide shoe 10 is part of the fixation element 3 and therefore is monolithically formed together with the element. Each fixation element 3 together with the slide shoe 10 is comprised of hard plastic material with excellent gliding properties. Each fixation element 3 has the shape of a quarter circle segment and has at its inner side, facing toward the center of the retaining element 1, an open groove 11 for insertion of a corner or an edge of the auxiliary device 13. On the exterior side of each fixation element 3 two further grooves 12 are provided which extend parallel to each other and into which an elastic element 4 is inserted, respectively. Since the grooves 12 in cross-section are of a circular configuration, the corresponding elastic elements 4 in cross-section are also of a circular shape and extend in endless loops about the outer sides of the four fixation elements 3. Both elastic elements 4 extend parallel to each other. For a safe lateral hold of the auxiliary device 13, on the lateral edges of the rectangular shape of the baseplate 2, sidewalls 14 are provided that extend slantedly in upward direction. Each sidewall 14 is provided at the topside with a damping element 15. Also, the hexagon shape of the baseplate 2 has a damping element 15. The cam disk 5 has at each of its end faces two cams 16 for controlling the fixation elements 3 and is in contact with the outer end of each slide shoe 10. Because the cam disk 5 is positioned at the bottom side of the baseplate 2, it is in contact with the second part of each slide shoe 10 which is positioned below the web 8. In the lateral area the cam disk 5 has an extension 17 that extends outwardly and is provided with an outwardly open guide opening 18 that is slot-shaped. A pin 19 of the actuating lever 6 projects into the guide opening 18. At the outer end of the guide opening 18 two lateral stops 20 for the pin 19 are provided. The stops 20 are monolithically formed with the extension 17 and are bent by 90 degrees upwardly relative to the extension 17. Since the pin 19 is arranged outside of the pivot point 21 of the actuating lever 6, upon pivoting of the actuating lever 6 it carries out a part-circular movement so that the pin 19 comes to rest against a stop 20 and in this way moves the cam disk 5 in the corresponding direction. Since the cam disk 5 is in contact with the slide shoes 10, the slide shoes 10 are forced outwardly as soon as the cams 16 of the cam disk 5 contact the slide shoes 10. In this way, the fixation elements 3 that are maintained under tension by means of the elastic elements 4 are forced diagonally outwardly so that as a whole the perimeter of the retaining element 1 becomes so large that an auxiliary device 13 can be inserted without problem. When the actuating lever 6 is returned into its closed position, the cam disk 5 controls the slide shoes 10, and thus the fixation elements 3, by means of the recesses arranged between the cams 16 in such a way inwardly that the groove 11 of each fixation element 3 is pressed because of the elastic element 4 against the corners of the auxiliary device 13 and the auxiliary device 13 is therefore retained safely. With this retaining system according to the invention, in particular flat auxiliary devices, such as navigation devices, smart phones or MP3 players, can be retained safely. Since the topside of the auxiliary device 13 is covered only by the outer edges of the groove 11, viewing the auxiliary device 13 and operating the auxiliary device 13 are not impaired.

Figure 1:
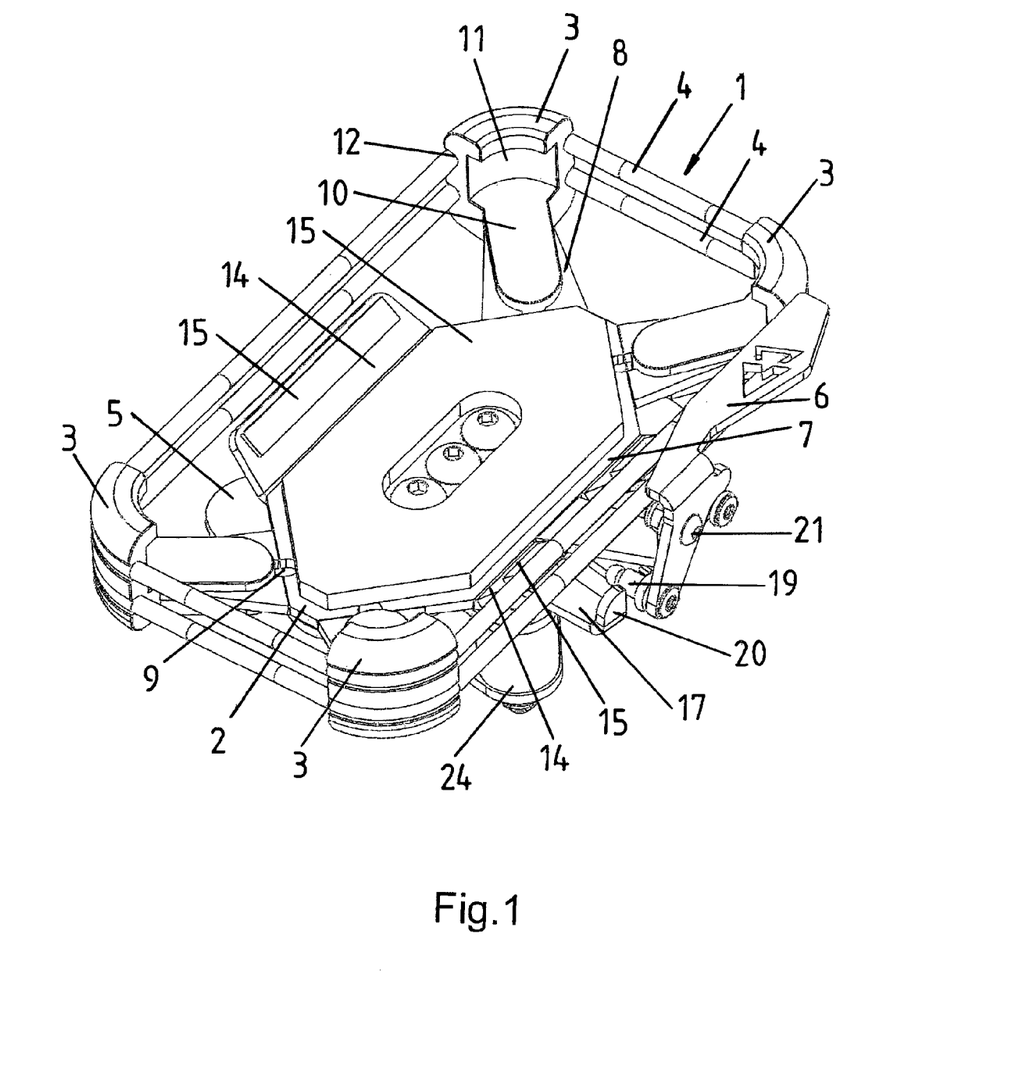
FIG. 1 a perspective view in a closed position without auxiliary device.
Figure 2:
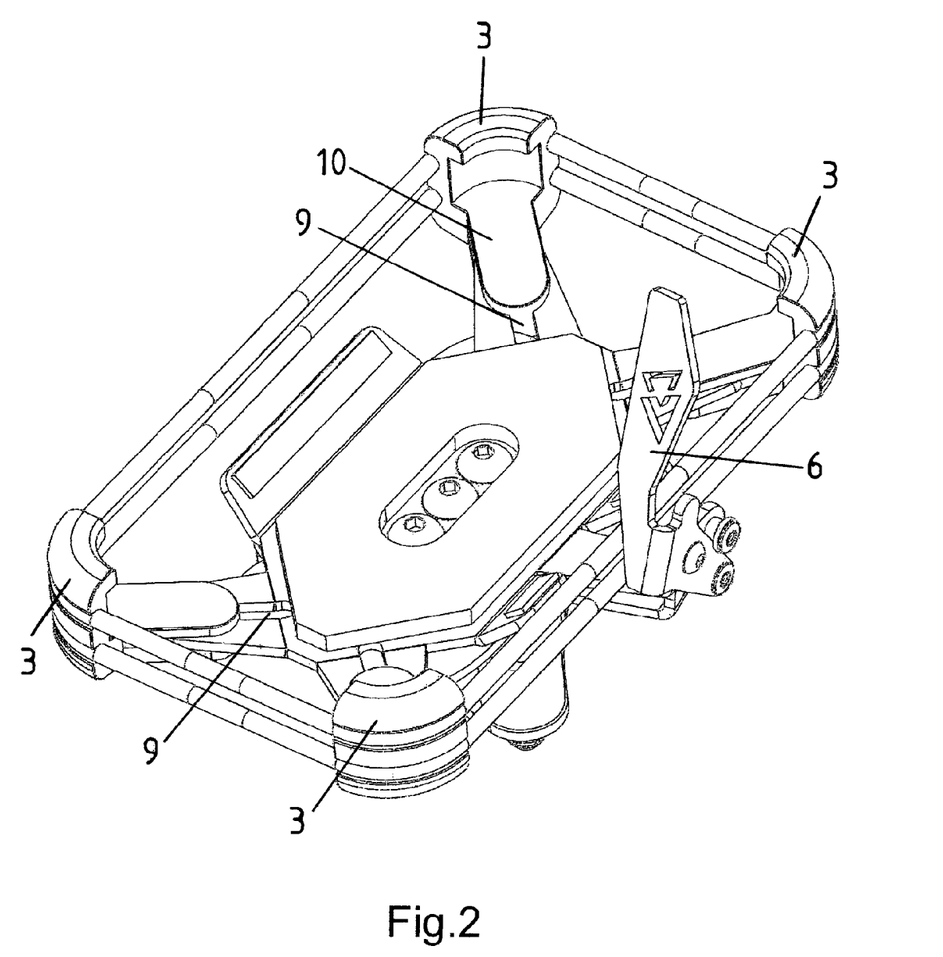
FIG. 2 a perspective view in an open position without auxiliary device.
Figure 3:
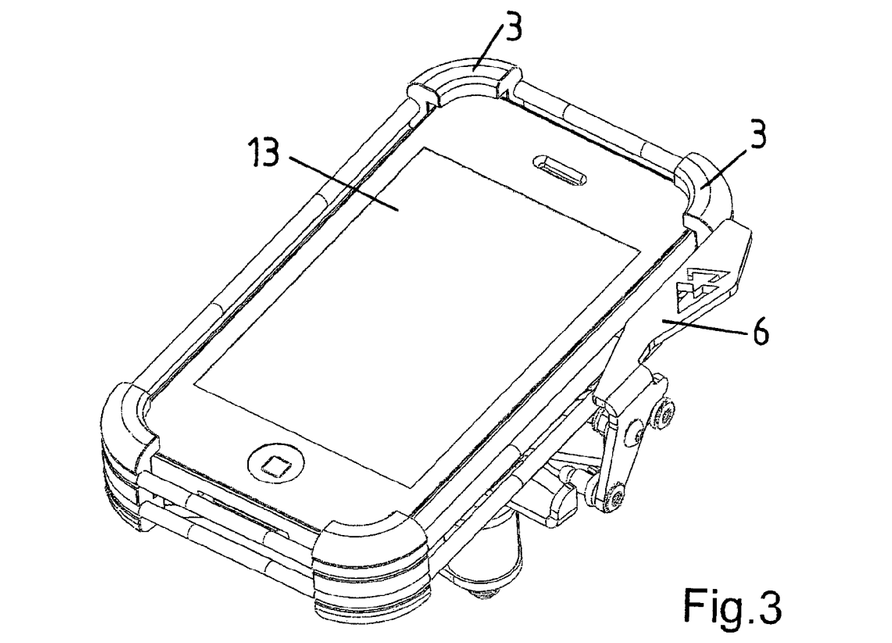
FIG. 3 a perspective view in a closed position with auxiliary device.
Figure 4:
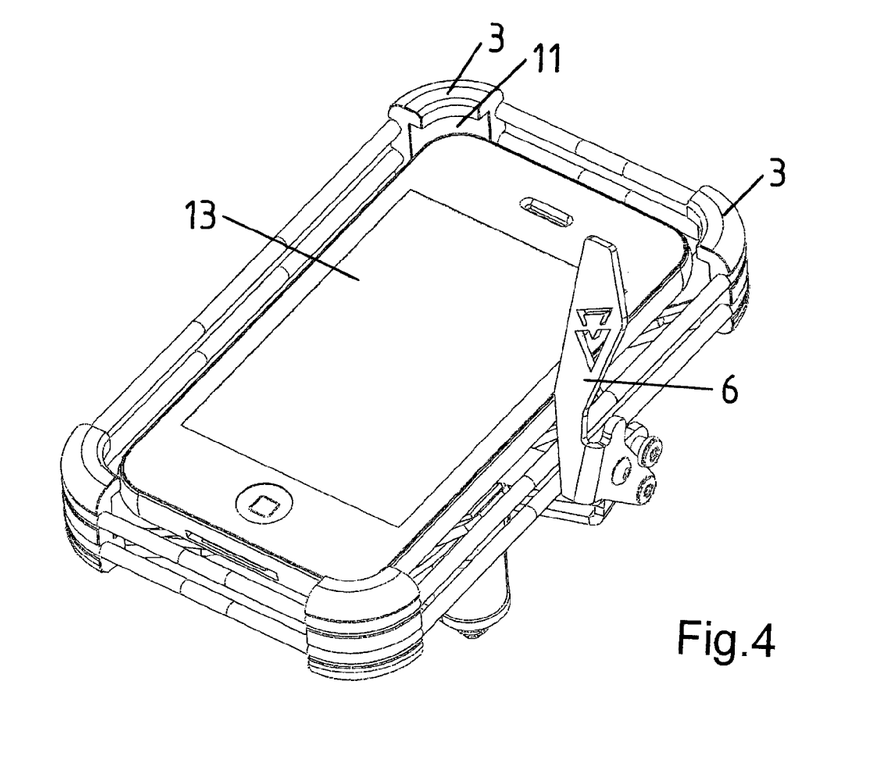
FIG. 4 a perspective view in an open position with auxiliary device.
Figure 5:
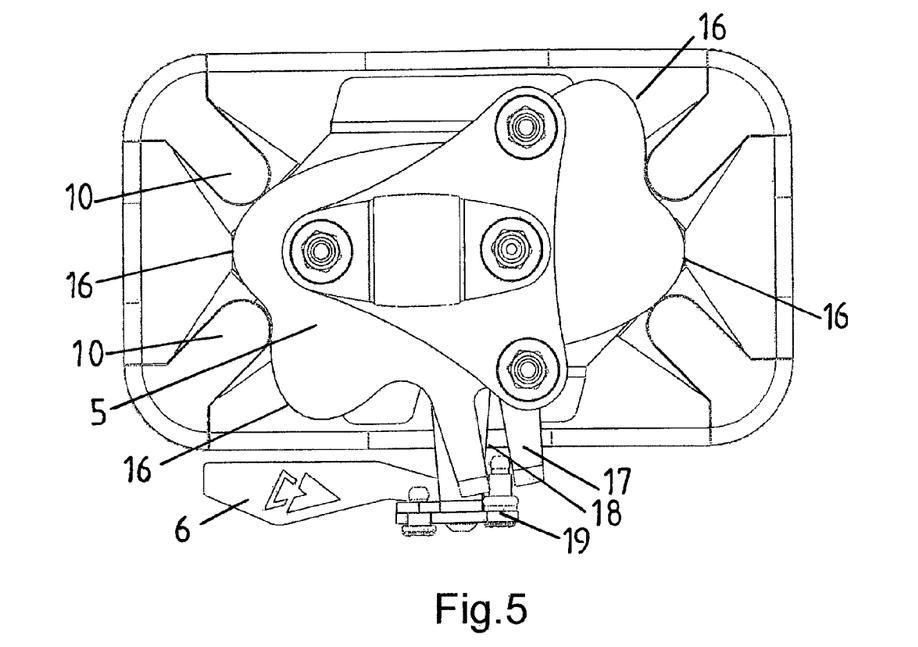
FIG. 5 a view from below in a closed position.
Figure 6:
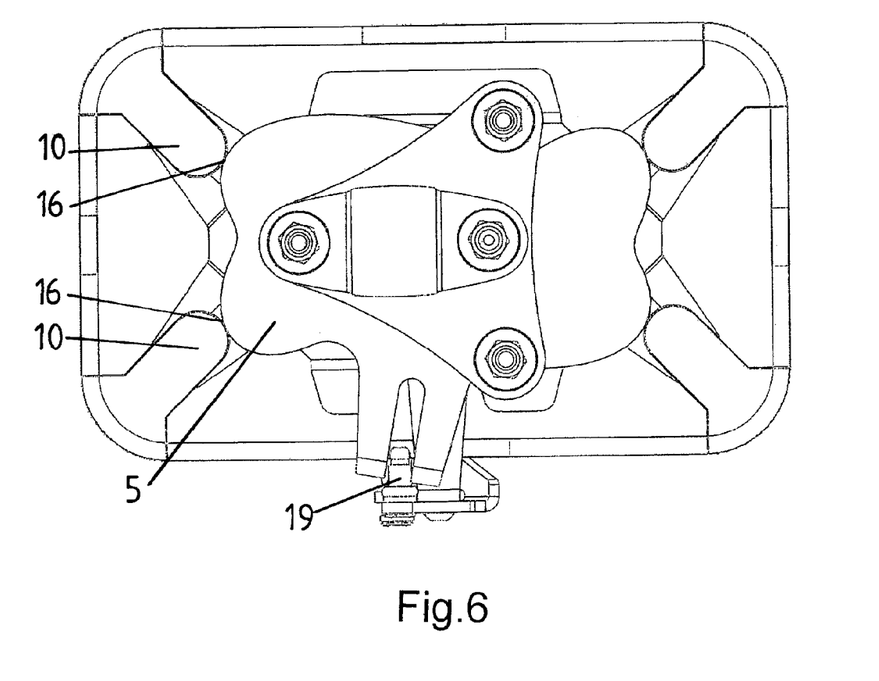
FIG. 6 a view from below in an open position.
Figure 7:
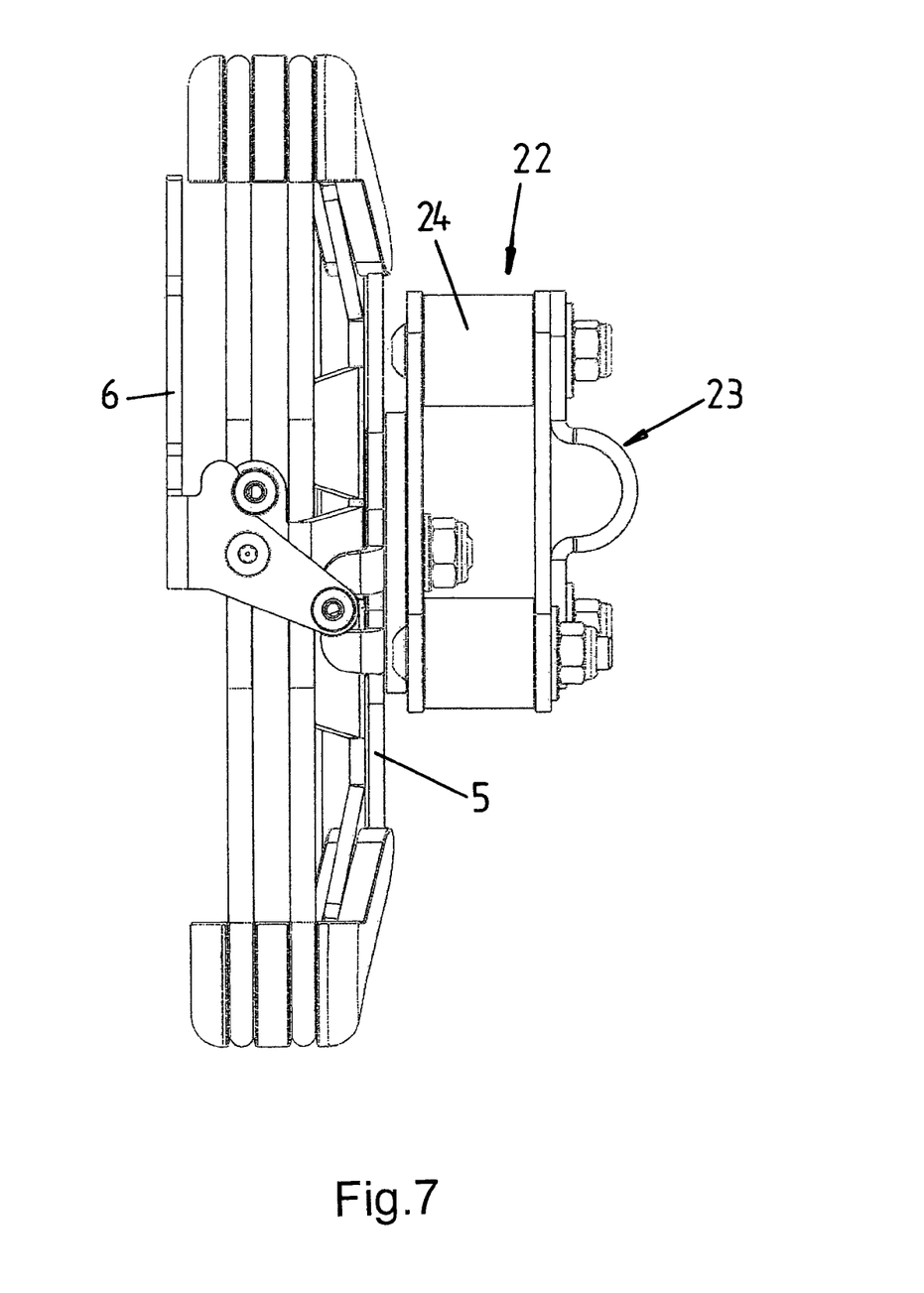
FIG. 7 a side view.
Figure 8:
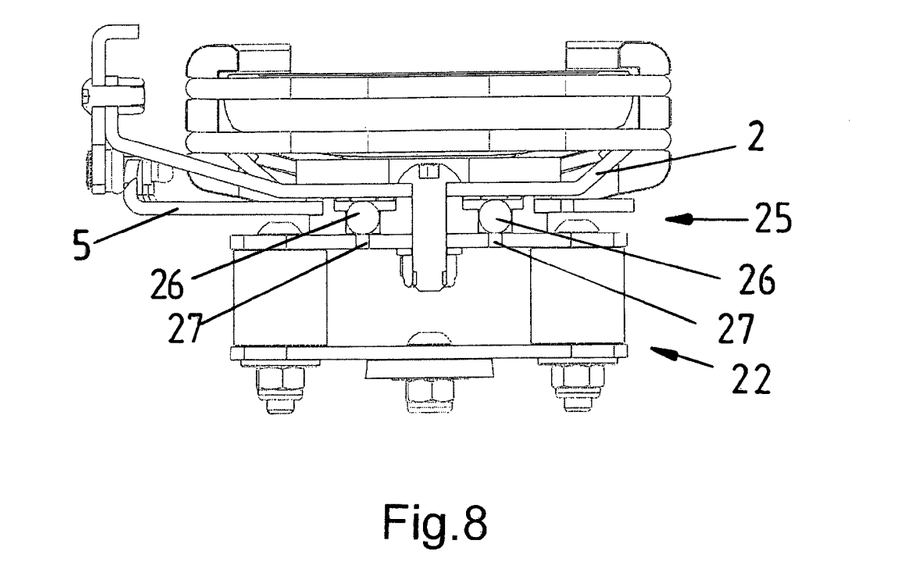
FIG. 8 a side view with pivot device.
Figure 9:
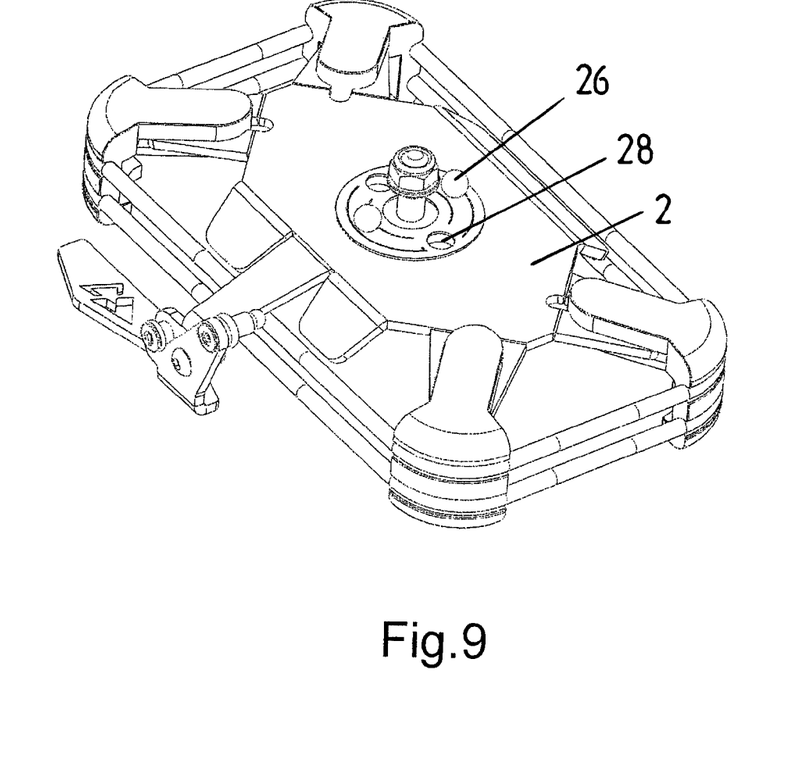
FIG. 9 a view from below onto the baseplate.

Below the cam disk 5 there are also a vibration decoupling device 22 and a fastening device 23 in order to attach the retaining system, for example, to a motorcycle. The vibration decoupling device 22 has several rubber dampers 24 in order to dampen impacts during driving and, as a whole, to protect the retaining system from blow or impact. In order for the retaining element 1 and thus the auxiliary device 13 to be pivotable, as needed, into a portrait format position or into a landscape format position, between the baseplate 2 and the vibration decoupling device 22 there is also a pivot device 25 for pivoting the retaining element 1 about 90 degrees, respectively. The pivot device 25 functions by a rotary locking action and has two spring-loaded balls 26 that may be seated on the topside of the vibration decoupling device 22 in appropriate four holes 27 and at the baseplate in oppositely positioned holes 28. Four positions, rotated by 90 degrees, respectively, can be adjusted by means of the pivot device 25.

What is claimed is:

1. A retaining system for fastening an electronic auxiliary device, the retaining system comprising:
   a retaining element;
   a cam control with a cam disk;
   an actuating lever acting on the cam disk;
   the retaining element having a perimeter that is effective for receiving an electronic auxiliary device;
   the perimeter adjustable so as to be greater in an open position than in a closed position of the retaining element;
   wherein the retaining element comprises:
      fixation elements adapted to engage the electronic auxiliary device;
      at least one elastic element engaging the fixation elements and tensioning the fixation elements;
      a baseplate;
      wherein the fixation elements are slidably arranged on the baseplate;
      wherein the actuating lever and the cam disk are pivotably supported on the baseplate;
      wherein the cam disk engages the fixation elements;
      wherein the actuating lever, when pivoted, moves the cam disk and the cam disk moves the fixation elements so that the retaining element is in the open position or in the closed position.

2. The retaining system according to claim 1, wherein the fixation elements each have at an inner side thereof a groove that is open toward a center of the retaining element, wherein the groove is adapted to receive a corner or an edge of the electronic auxiliary device.

3. The retaining system according to claim 1, wherein the fixation elements each have a slide shoe slidable in a slotted hole guide of the baseplate.

4. The retaining system according to claim 1, wherein the fixation elements each have on an outer side thereof at least one groove, wherein the at least one elastic element is inserted into the at least one groove.

5. The retaining system according to claim 1, wherein the at least one elastic element is a rubber cord.

6. The retaining system according to claim 1, wherein the cam disk is arranged on a bottom side of the baseplate and has a guide opening, wherein the actuating lever has a pin that engages the guide opening.

7. The retaining system according to claim 6, wherein the cam disk has two lateral stops positioned adjacent to the guide opening and interacting with the pin, wherein the pin is arranged on the actuating lever such that the pin carries out a part-circular movement when the actuating lever is pivoted.

8. The retaining system according to claim 1, further comprising a fastening device connected to the baseplate.

9. The retaining system according to claim 8, further comprising a vibration decoupling device, wherein the fastening device is connected to the baseplate with interposition of the vibration decoupling device.

10. The retaining system according to claim 9, further comprising a pivot device connected between the baseplate and the vibration decoupling device, wherein the pivot device enables pivoting of the retaining element by 90 degrees, respectively, such that the electronic auxiliary device is positionable in portrait format or in landscape format.

11. The retaining system according to claim 8, further comprising a pivot device connected between the baseplate and the fastening device, wherein the pivot device enables pivoting of the retaining element by 90 degrees, respectively, such that the electronic auxiliary device is positionable in portrait format or in landscape format.

* * * * *